(12) United States Patent
Suwald (10) Patent No.: US 9,916,053 B2
(45) Date of Patent: Mar. 13, 2018

(54) USER INTERFACE UNIT, ELECTRONIC DEVICE AND MANUFACTURING METHOD

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 36 days.

(21) Appl. No.: 14/970,464

(22) Filed: Dec. 15, 2015

(65) Prior Publication Data

US 2016/0170532 A1    Jun. 16, 2016

(30) Foreign Application Priority Data

Dec. 15, 2014    (EP) .................................... 14197905

(51) Int. Cl.
*G06F 3/044*    (2006.01)

(52) U.S. Cl.
CPC .... *G06F 3/044* (2013.01); *G06F 2203/04103* (2013.01)

(58) Field of Classification Search
CPC ........... G06F 3/044; G06F 2203/04111; G06F 2203/04112
USPC ............................... 345/173, 174; 178/18.06
See application file for complete search history.

(56) References Cited

U.S. PATENT DOCUMENTS

| 8,681,416 B2 | 3/2014 | Suwald |
| 2009/0159344 A1 | 6/2009 | Hotelling et al. |
| 2010/0198034 A1* | 8/2010 | Thomas ............. A61B 5/14532 600/365 |
| 2010/0265211 A1* | 10/2010 | Oishi ...................... G06F 3/044 345/174 |
| 2011/0163856 A1* | 7/2011 | Weidinger ......... G06K 19/0723 340/10.41 |
| 2012/0306802 A1 | 12/2012 | McCracken |
| 2013/0086389 A1 | 4/2013 | Suwald |
| 2014/0091815 A1 | 4/2014 | Suwald |
| 2014/0152610 A1 | 6/2014 | Suwald |
| 2014/0313159 A1 | 10/2014 | Wilson et al. |
| 2015/0302289 A1 | 10/2015 | Suwald |

FOREIGN PATENT DOCUMENTS

| CN | 103091924 A | 5/2013 |
| EP | 2 667 156 A1 | 11/2013 |
| EP | 2 772 837 A1 | 9/2014 |

OTHER PUBLICATIONS

Extended European Search Report for Patent Appln. No. 14197905.4 (dated May 7, 2015).
Office Action for Counterpart CN Patent Appl. No. 201510662696.9 (dated Jan. 22, 2018).

* cited by examiner

*Primary Examiner* — Stephen Sherman (57) ABSTRACT

There is disclosed a user interface unit for an electronic device, said user interface unit comprising a two-dimensional capacitive sensor structure, wherein the capacitive sensor structure comprises an array of corner sensor elements each comprising a capacitor over its area, and wherein the capacitive sensor structure further comprises a central sensor element located between the corner sensor elements and comprising a capacitor over its area. Furthermore, there is disclosed a corresponding electronic device, as well as a corresponding method of manufacturing a user interface unit for an electronic device.

18 Claims, 11 Drawing Sheets

USER INTERFACE UNIT, ELECTRONIC DEVICE AND MANUFACTURING METHOD

CROSS-REFERENCE TO RELATED APPLICATIONS

This application claims the priority under 35 §119 of European patent application no. 14197905.4, filed on Dec. 15, 2014, the contents of which are incorporated by reference herein.

FIELD

The present disclosure relates to a user interface unit for an electronic device. Furthermore, the present disclosure relates to a corresponding electronic device and to a method of manufacturing a user interface unit for an electronic device.

BACKGROUND

Today, electronic devices such as smart cards are widely used in society. For example, smart cards may be used as electronic identity (eID) cards. The end-user acceptance of such eID cards, however, is still relatively low. Although the eID cards are relatively secure, due to their cryptographic capabilities, they are usually not equipped with a user interface suitable for entering user credentials, i.e. a so-called "authentication interface". As a consequence, the majority of eID users still enter their PIN code through personal computers and laptops, which increases the risk that their credentials are intercepted by malicious software such as Trojans and key-logger programs.

It is known to integrate an authentication interface into a smart card. For example, EP 2 667 156 A1 describes a capacitive position sensor system for determining the position of an object, wherein the object is positioned within a sensitive area of the capacitive position sensor system and changes the capacitance of capacitors being arranged underneath the object. The capacitive position sensor system comprises a first plurality of sensing elements, each sensing element comprising a first capacitor having a first electrode and a second electrode, wherein each first electrode is coupled via a switch to a voltage supply to form a switched capacitor filter, wherein the second electrodes are coupled to form a sensing line, a sensing unit, wherein the sensing unit is adapted to sense a voltage level representing the amount of charge being present on the sensing line, and a control unit, wherein the control unit is adapted to apply a drive signal to each of the switches being coupled to the first electrodes. In one integration cycle, a part of the switches being coupled to the first electrodes is closed so that a part of the first capacitors is driven by a first drive signal, wherein the sensing unit is adapted to sense the voltage level representing the sum of the amount of charge of the part of the first capacitors, wherein the number of the switches being closed is at least two. The control unit is adapted to determine the position of the object by analyzing the results of a plurality of sensed voltage levels of a plurality of integration cycles. This capacitive position sensor system is an example of a touch-based user interface that may be embedded into a smart card.

Figure 1A:
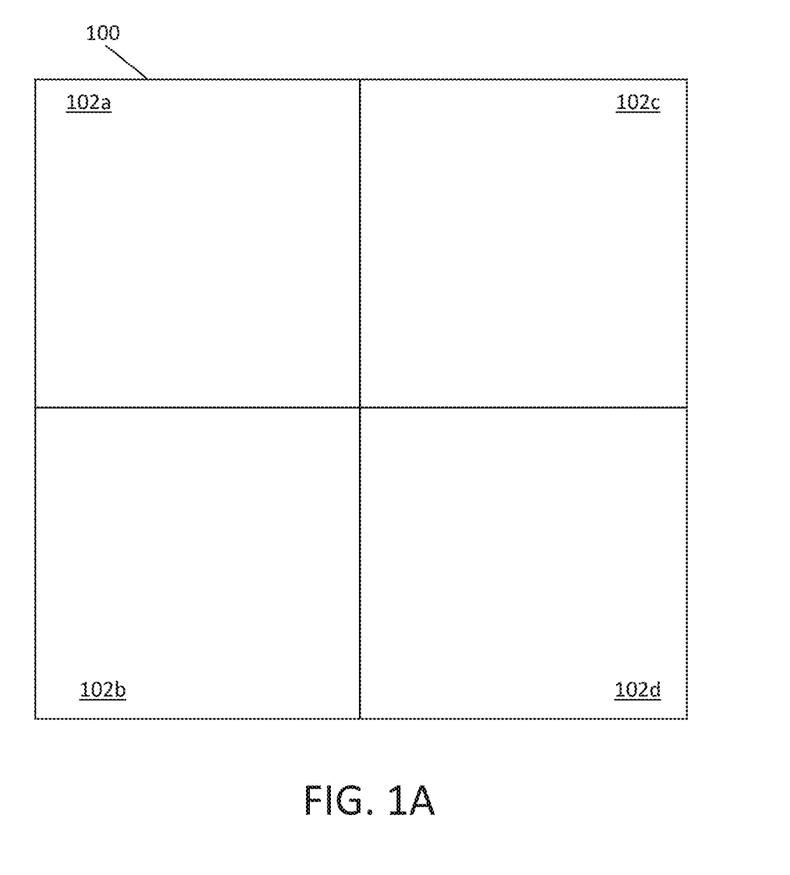
FIGS. 1A and 1B show a conventional user interface unit.
Figure 1B:
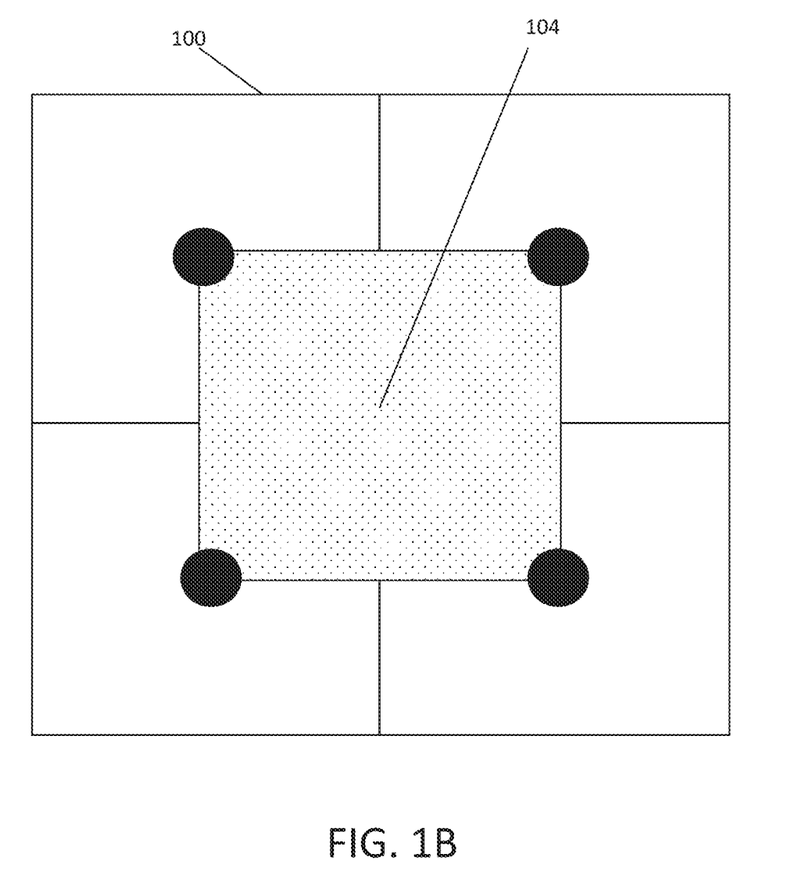

It is still relatively difficult to fabricate a multi-functional eID card with an embedded authentication interface. For instance, it is typically necessary to use double-sided inlays requiring VIAs (i.e. contacts between both layers) and to use a large number of sensor terminals. It might be desirable to use a smaller number of sensor terminals, which in turn would require less interface connections to a processing module, thereby reducing cost and increasing reliability and operational lifetime. Reducing the number of sensor terminals may be achieved by reducing the number of sensors embedded in the authentication interface. For example, the authentication interface may be based on a relatively simple 2×2 sensor array, as shown in FIG. 1A. However, in that case the usable area of the authentication interface is relatively small, as shown in FIG. 1B. Therefore, a conflict seems to exist between the manufacturing requirements and the performance requirements of such interfaces.

FIGS. 1A and 1B show a conventional user interface unit. FIG. 1A shows a user interface unit 100 which comprises a plurality of capacitive sensors 102a, 102b, 102c, 102d. The capacitive sensors 102a, 102b, 102c, 102d are arranged in an array that has a size of 2 by 2 sensors. FIG. 1B shows a usable area 104 of the user interface unit 100 shown in FIG. 1A.

In such user interface units, the position of an object, for example a user's finger, is typically obtained by applying a center-of-gravity calculation to the activity levels determined for the individual sensors in the sensor arrays. However, the outer sensors exhibit a dead-zone at their perimeter where a change in position will not result in a change of the measured activity level. Typically, the size of the dead-zone in each dimension is the size of the sensor in that dimension minus the size of the finger. When applying a weighting function such as a center-of-gravity formula the resulting position is only valid inside a part of the total sensor area. The area in which a resulting position is valid is referred to as the "usable area" herein. The usable area is the total area covered by all sensors reduced by the dead-zone areas of all sensors, as indicated by the black dots in FIG. 1B. For a 2×2-sensor array, as shown in FIG. 1B, the usable area may have a size of ¼ of the total size of the sensor array. For a 3×3 sensor array the usable area may typically have a size of 4/9 of the total size of the sensor array. More sensors typically result in a larger relative usable area. For example, for a 4×4 sensor the usable area may have a size of 9/16 of the total size of the sensor array.

However, an increased number of sensors results in more sensor signals, which typically requires a longer capturing and processing time and hence requires more energy. Furthermore, in case of an array-like sensor structure having a size of 3 or more in each dimension, the inner sensors may not be contacted without signal crossings or VIAs. As a consequence, two-layer inlays with VIAs may be required, which may increase the manufacturing cost and reduce the user interface's reliability. Furthermore, sensor structures that require double-sided inlays may not support economic inlay manufacturing such as by silver-ink printing, which is typically requested by some smart card manufacturers. Similar problems may occur in other electronic devices, such as controllers for controlling consumer devices, white good appliances and vehicle components.

SUMMARY

There is disclosed a user interface unit for an electronic device, said user interface unit comprising a two-dimensional capacitive sensor structure, wherein the capacitive sensor structure comprises an array of corner sensor elements each comprising a capacitor over its area, and wherein the capacitive sensor structure further comprises a central sensor element located between the corner sensor elements and comprising a capacitor over its area.

In illustrative embodiments, the respective capacitors of neighbouring corner sensor elements in each dimension extend towards each other thereby defining at least one intermediate region therebetween, the area of the or each intermediate region covered by the respective capacitors being in a respective fixed ratio, and wherein the intermediate regions in both dimensions define at least one central region therebetween, the area of the or each central region being covered by the capacitor of the central sensor element.

In further illustrative embodiments, the central sensor element has a substantially octagonal shape or a substantially rectangular shape.

In further illustrative embodiments, each capacitor has a first electrode and a second electrode, wherein the first electrode is specific to the sensor element comprising the respective capacitor, and wherein the second electrode is a common signal electrode.

In further illustrative embodiments, the at least one intermediate region is defined by interdigitated first electrodes of the capacitors extending from the neighbouring corner sensor units.

Furthermore, there is disclosed an electronic device that comprises a user interface unit of the kind set forth, said electronic device further comprising a processing unit for processing sensor signals generated by the user interface unit and a plurality of signal lines for transmitting said sensor signals from the user interface unit to the processing unit, wherein each one of the capacitors is connected to one of the signal lines, wherein each one of the capacitors is arranged to generate one of the sensor signals and to transmit said one of the sensor signals to the processing unit through said one of the signal lines.

In further illustrative embodiments, the processing unit is arranged to execute a computer program which applies a weighting function to the sensor signals generated by the user interface unit.

In further illustrative embodiments, said electronic device further comprises a wireless communication module and a loop antenna for wireless communication, wherein the wireless communication module comprises an integrated antenna cross-over, said integrated antenna cross-over comprising a first antenna terminal of the wireless communication module being located outside the loop of the antenna and a second antenna terminal of the wireless communication module being located inside the loop of the antenna.

In further illustrative embodiments, the processing unit and the wireless communication module are comprised in a monolithically integrated circuit.

In further illustrative embodiments, the user interface unit and the loop antenna are integrated in a single-layer printed circuit-board.

In further illustrative embodiments, the user interface unit is arranged to identify a touch-based user input interaction within a plurality of different areas formed by predefined position boundaries, and wherein each one of the different areas represents a particular key of a keypad.

In further illustrative embodiments, said electronic device further comprises a user feedback indicator for guiding a user through a touch-based user input process.

In further illustrative embodiments, the user interface element is arranged to receive a touch-based user input which represents a gesture for activating a function of the electronic device.

In further illustrative embodiments, the electronic device is a smart card, a controller for controlling a consumer device, a controller for controlling a white good appliance, or a controller for controlling a vehicle component.

Furthermore, there is disclosed a method of manufacturing a user interface unit for an electronic device, the method comprising providing the user interface unit with a two-dimensional capacitive sensor structure, providing the capacitive sensor structure with an array of corner sensor elements each comprising a capacitor over its area, and providing the capacitive sensor structure with a central sensor element located between the corner sensor elements and comprising a capacitor over its area.

DESCRIPTION OF DRAWINGS

Embodiments will be described in more detail with reference to the appended drawings, in which.

DESCRIPTION OF EMBODIMENTS

In accordance with the present disclosure a user interface unit for a smart card is provided. The user interface unit comprises a two-dimensional capacitive sensor structure. The capacitive sensor structure comprises an array of corner sensor elements, and each corner sensor element comprises a capacitor over its area. Furthermore, the capacitive sensor structure comprises a central sensor element located between the corner sensor elements, which also comprises a capacitor over its area. By adding a central sensor element to the capacitive sensor structure, the sensitivity of the capacitive sensor structure may be improved. Thus, the capacitive sensor structure may be able to differentiate between finer movements of a user's finger, for example.

Figure 2:
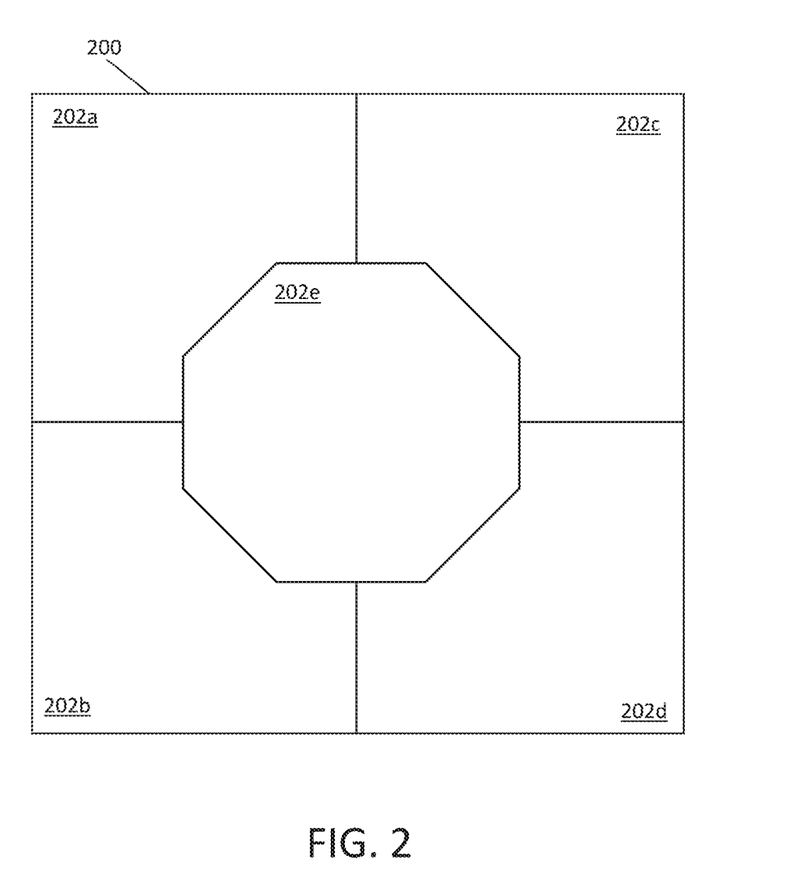
FIG. 2 shows an illustrative embodiment of a user interface unit.

FIG. 2 shows an illustrative embodiment of a user interface unit 200. In this example, the user interface unit 200 comprises a capacitive sensor structure which comprises four capacitive sensors 202a, 202b, 202c, 202d. The four capacitive sensors 202a, 202b, 202c, 202d are arranged as an array. The four capacitive sensors 202a, 202b, 202c, 202d thus form corner sensor elements. Furthermore, the capacitive sensor structure comprises a fifth capacitive sensor 202e which is located between the corner sensor elements 202a, 202b, 202c, 202d. In this example, the fifth capacitive sensor 202, i.e. the central sensor element, has a substantially octagonal shape. It has been found that a central sensor element with a substantially octagonal shape may provide further increased sensitivity to movements. Furthermore, it has been found that making the capacitance of the corner sensor elements 202a, 202b, 202c, 202d and the fifth capacitive sensor 202e the same improves the resulting sensor linearity.

In illustrative embodiments, the respective capacitors of neighbouring corner sensor elements extend towards each other in each dimension, thereby defining at least one intermediate region between the neighbouring corner sensor elements. Furthermore, the area of the or each intermediate region covered by the respective capacitors is in a respective fixed ratio. For example, if the capacitive sensor structure comprises an array that has a size of 2 by 2 corner sensor elements, then an intermediate region defined by the upper two corner sensor elements extending towards each other may have a 50:50 ratio. In this way, a 'hardware weighting' function may be applied to the signals generated by the sensor elements, in which the ratio 50:50 effectively represents a weighting factor of 0.5. Furthermore, the intermediate regions in both dimensions may define at least one central region therebetween, whose area is covered by the capacitor of the central sensor element.

Figure 3:
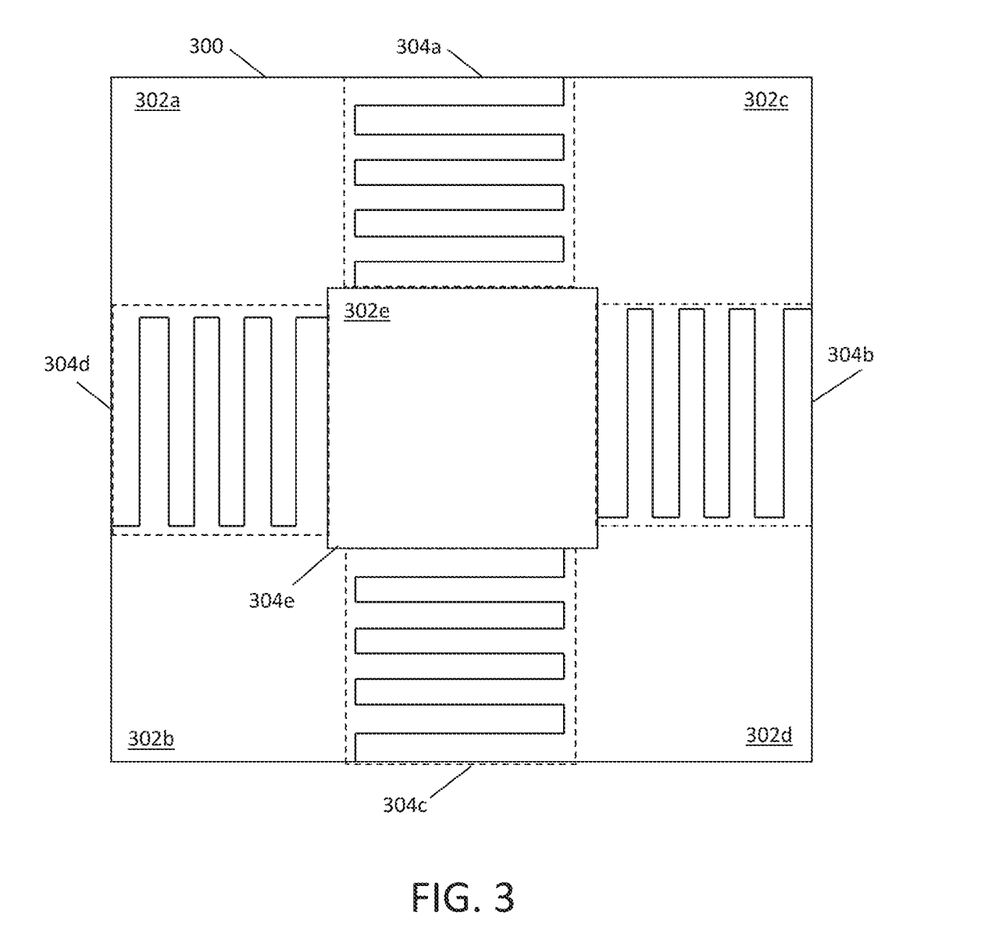
FIG. 3 shows a further illustrative embodiment of a user interface unit.

FIG. 3 shows a further illustrative embodiment of a user interface unit 300. In this example, the user interface unit 300 comprises five capacitive sensors 302a, 302b, 302c, 302d, 302e. The capacitive sensors 302a, 302b, 302c, 302d, are arranged in an array of 2 by 2 corner sensor elements. The capacitive sensors 302a, 302b, 302c, 302d are an example of corner sensor elements whose capacitors extend towards each other in an interlaced manner. Thereby, intermediate regions 304a, 304b, 304c, 304d are defined. The area of each intermediate region which is covered by the respective capacitors is in a fixed ratio of 50:50. For example, in the first intermediate region 304a, the respective capacitors of sensor elements 302a and 302c each cover 50% of the total area covered by said capacitors. Thus, if this intermediate region 304a is touched, then both sensor elements 302a, 302c generate a signal that is weighted with a factor 0.5. Furthermore, the intermediate regions 304a, 304b, 304c, 304d in both dimensions define at least one central region 304e therebetween. The area of this central region 304e is covered by the capacitor of the central sensor element 302e. It has been found that the embodiment shown in FIG. 3 may provide further increased sensitivity to movements.

Figure 4:
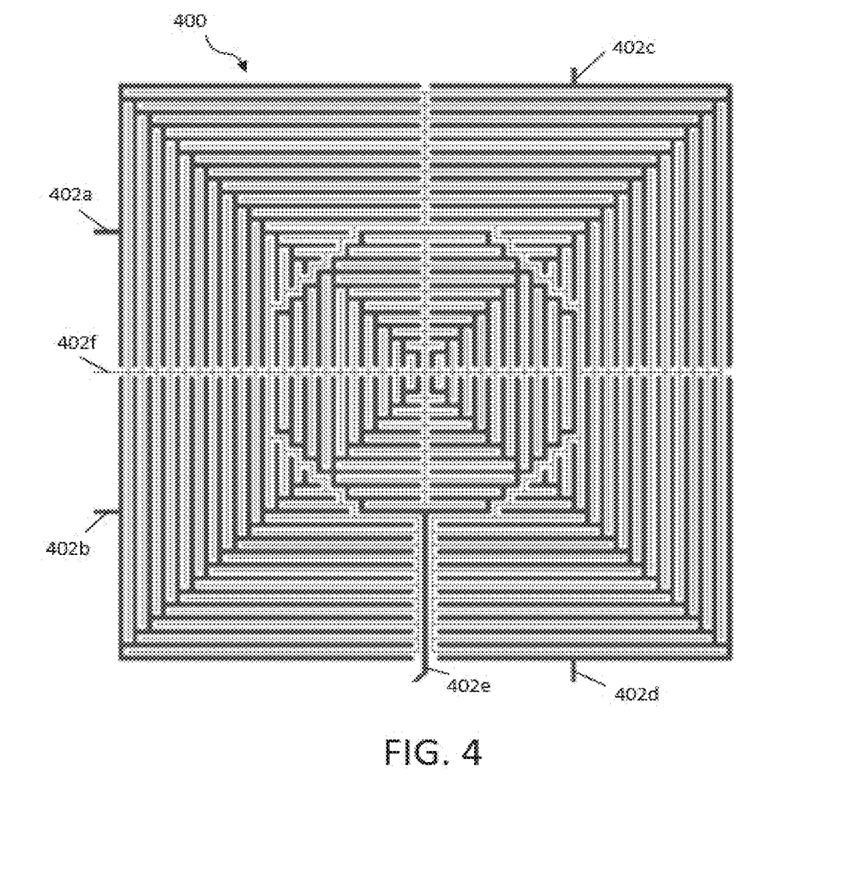
FIG. 4 shows an example of an implementation of a user interface unit.

FIG. 4 shows an example of an implementation of a user interface unit 400. In particular, the sensor array which is shown schematically in FIG. 2 may be implemented by means of the structure shown in FIG. 4. The user interface unit 400 comprises five sensor-specific electrodes 402a, 402b, 402c, 402d, 402e, each of which forms a part of a corresponding capacitive sensor 202a, 202b, 202c, 202d, 202e. Another part of the capacitive sensors 202a, 202b, 202c, 202d, 202e is formed by a common electrode 402f. The common electrode 402f may be common to all capacitive sensors 202a, 202b, 202c, 202d, 202e. Thus, each capacitive sensor 202a, 202b, 202c, 202d, 202e comprises a capacitive structure that may detect the presence of non-isolating objects, such as human fingers. A capacitive sensor structure may contain five capacitive sensors of this kind; typically the sensor-specific electrode of each capacitive sensor is electrically connected to a sensor-specific signal line while the common electrode is electrically connected to a common reference signal line. In this example implementation, the capacitors do not extend towards each other in an interlaced manner.

Figure 5A:
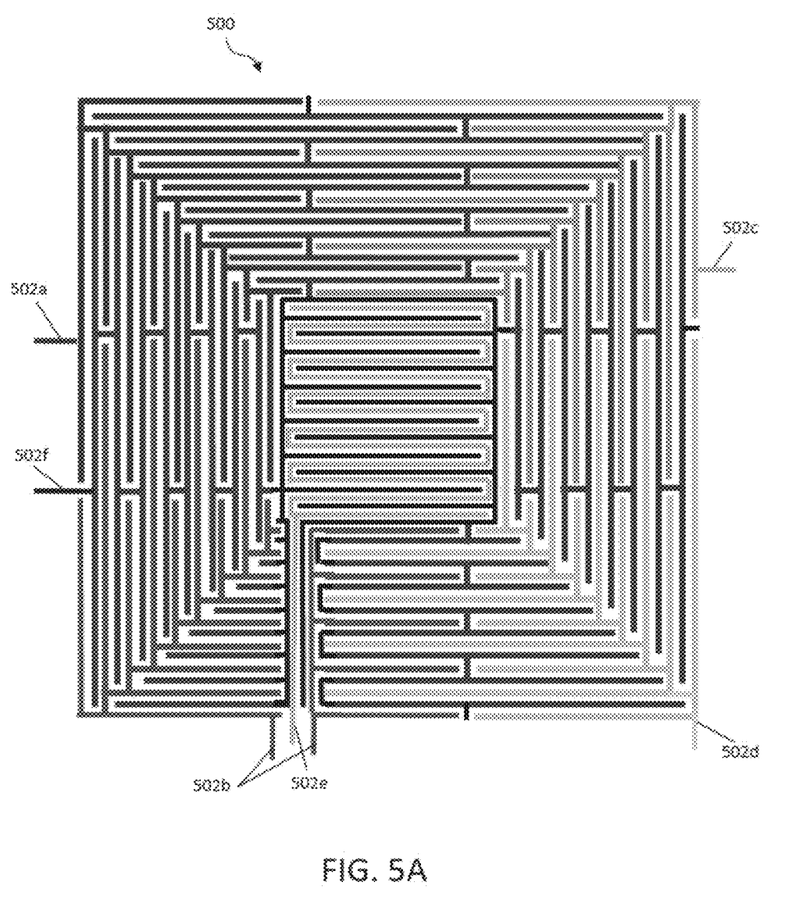
FIG. 5A shows another example of an implementation of a user interface unit.

FIG. 5A shows another example of an implementation of a user interface unit 500. In particular, the sensor array which is shown schematically in FIG. 3 may be implemented by means of the structure shown in FIG. 5A. In this example, there are intermediate regions in which neighbouring corner sensor elements extend toward each other, as described above. Furthermore, the intermediate regions in both dimensions define a central region there-between. The user interface unit 500 comprises five sensor-specific electrodes 502a, 502b, 502c, 502d, 502e, each of which forms a part of a corresponding capacitive sensor 302a, 302b, 302c, 302d, 302e. Another part of the capacitive sensors 302a, 302b, 302c, 302d, 302e is formed by a common electrode 502f. The common electrode 502f may be common to all capacitive sensors 302a, 302b, 302c, 302d, 302e. It is noted that the lower-left capacitive sensor 302b may be implemented by a sensor-specific electrode 502b which has been cut into two parts, in order to facilitate single-layer printing.

Figure 5B:
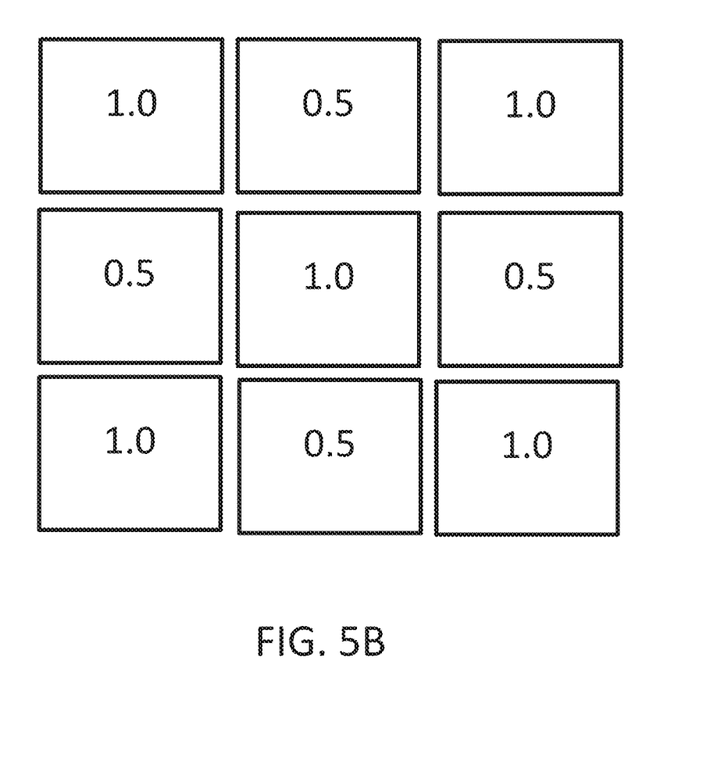
FIG. 5B shows a distribution of hardware-weighting factors for regions of the user interface unit shown in FIG. 5A.

FIG. 5B shows a distribution of hardware-weighting factors for regions of the user interface unit shown in FIG. 5A. Each of the intermediate regions between the neighbouring corner sensor elements has a hardware-weighting factor of 0.5. That is to say, if one of these intermediate regions is touched, then the corresponding sensor elements each generate a signal that carries a weight of 0.5 compared to the signal generated by the upper-left sensor element alone if the upper-left region is touched, for example. In the center region, the hardware-weighting factor is 1. That is to say, if the central region is touched, then the central sensor element alone will generate a signal that carries a weight of 1.

Figure 6:
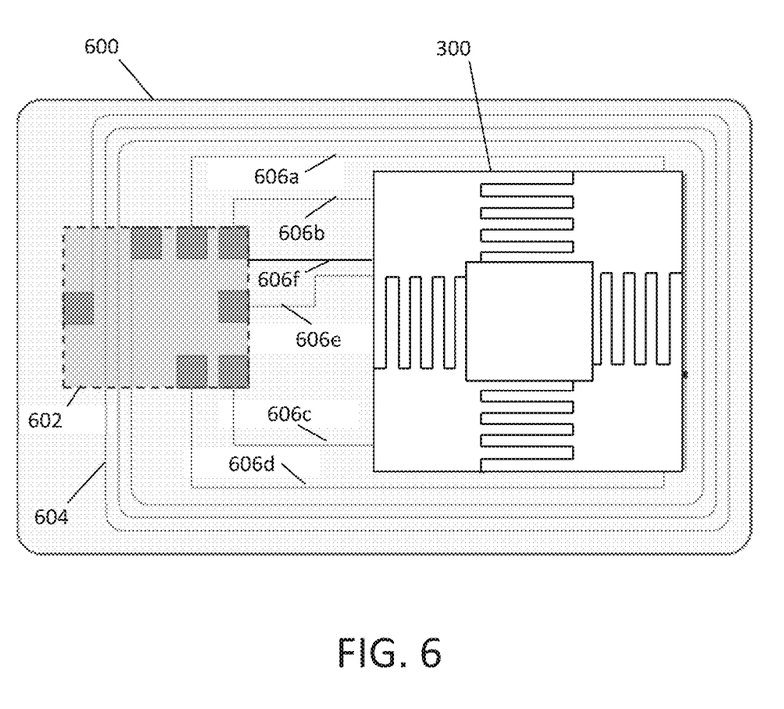
FIG. 6 shows an illustrative embodiment of a smart card.

FIG. 6 shows an illustrative embodiment of a smart card 600. In particular, the smart card 600 comprises a single-layer inlay in which a user interface unit in accordance with the present disclosure has been embedded. In this example, the smart card 600 comprises a user interface unit 300 as shown in FIG. 3. Furthermore, the smart card 600 may comprise a processing module 602 which comprises a wireless communication module, in particular an RFID module, as well as a processing unit of the kind set forth. Furthermore, the processing module 602 may be connected via sensor-specific signal lines 606a, 606b, 606c, 606d, 606e, to the respective capacitive sensors of the user interface unit 300. Furthermore, the processing module 602 may be connected to the user interface unit 300 via a common signal line 606f of the kind set forth. The smart card 600 may further comprise an antenna 604 for wireless communication, in particular an RFID antenna, connected to the wireless communication module of the processing module 602.

Furthermore, the RFID module may comprise an integrated antenna cross-over. The term "integrated antenna cross-over" refers to antenna terminals which are integrated in the RFID module and which are arranged in such a way that signal lines which are needed for connecting the antenna to the RFID module do not cross over one another. In particular, the RFID module's contact terminals that connect the module to the antenna 604 may be arranged in the manner shown in FIG. 6, i.e. without a cross-over in the form of an additional wire crossing the antenna wires. For example, in case the antenna is a rectangular loop antenna as shown, the integrated antenna cross-over may comprise a first antenna terminal of the RFID module being located outside the loop of the antenna and a second antenna terminal of the RFID module being located inside the loop of the antenna. This design may achieve that the antenna 604 does not cross any of the signal lines 606a, 606b, 606c, 606d, 606e, 606f, and that no other signal crossings may be required. Thus, this design may further facilitate creating single-sided printed inlays without VIAs. It is noted that only a schematic positioning of the signal lines 606a, 606b, 606c, 606d, 606e, 606f is shown, i.e. the skilled person may further optimize this design in order to minimize the cross-coupling between signal lines 606a, 606b, 606c, 606d, 606e, 606f and the antenna 604.

Figure 7:
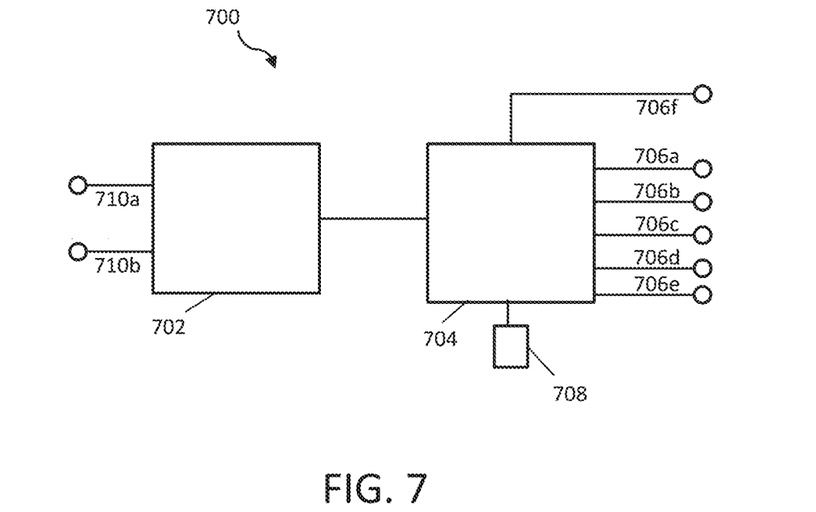
FIG. 7 shows an example of a processing module.

FIG. 7 shows an example of a processing module 700 of the kind set forth. The processing module 700 comprises a first sub-module 702, which in turn may comprise a rectifier, a power management device or a voltage conditioning device, and a secure element. Each of these features may be implemented by means of hardware components which are known as such, for example. The first sub-module 702 may comprise a first antenna terminal 710a and a second antenna terminal 710b arranged as described with reference to FIG. 6 above. The first sub-module 702 may exchange data with a second sub-module 704, which may comprise an input/output controller and a touch sensor position decoder. The second sub-module 704 may be arranged to control an optical feedback indicator 708. Furthermore, the second sub-module 704 may be connected to sensor-specific signal lines 706a, 706b, 706c, 706d, 706e, and to a common signal line 706f, which are in turn connected to the user interface unit (not shown). The components of the first sub-module 702 and the second sub-module 704 may be individual integrated components and discrete components or monolithically integrated components. The optical feedback indicator 708 may be included in order to provide better user guidance during data entry. Alternatively and without limitation, an acoustic feedback indicator may be used.

Figure 8:
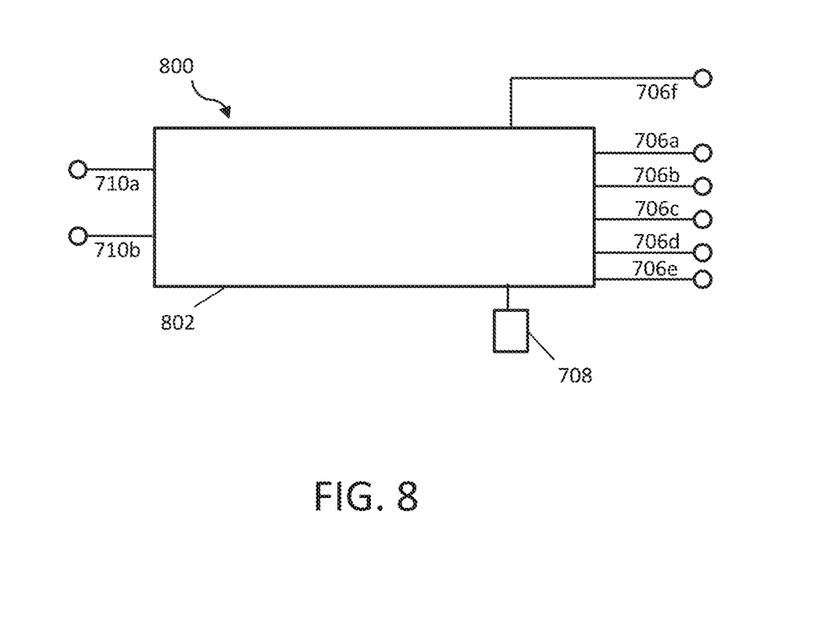
FIG. 8 shows a further example of a processing module.

FIG. 8 shows a further example of a processing module 800. In this example, the processing module 800 comprises a monolithically integrated circuit 802 comprising the rectifier, the power management device or voltage conditioning device, the secure element and the touch sensor position decoder. In such a monolithically integrated version the user interface unit may function as a state machine that may control the required input/output function of the processing module 800.

Figure 9:
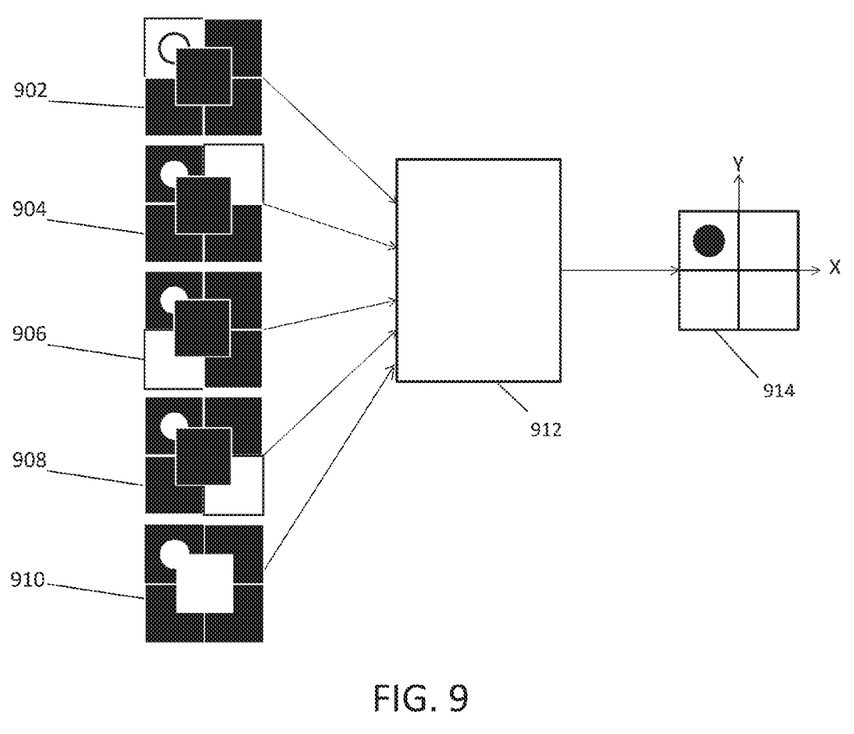
FIG. 9 shows an illustrative operation of a user interface unit.

FIG. 9 shows an illustrative operation of a user interface unit of the kind set forth. In particular, it shows the use of a sampling and Finite Impulse Response (FIR) noise filter function that may be used in combination with a user interface unit of the kind set forth. In a scanning step 902, the upper-left capacitive sensor is touched, but not evaluated. This is depicted in the figure by a circle (illustrating touching the sensor) in a blank—that is, white—upper-left sensor position. In four further scanning steps 904, 906, 908, 910 the upper-left capacitive sensor is touched and evaluated. This is depicted in the figure by a circle (illustrating touching the sensor) in a black upper-left sensor position. It is noted that the term term "not evaluated" means that a sensor signal is used for determining a position. In contrast, the term "not evaluated" means that a sensor generates a signal because it is touched, but this signal is ignored in the subsequent calculation for determining a position. For example, this may be controlled by means of switches which enable/disable the measurement of the capacitance variation of a particular capacitive sensor. In that case, "evaluated" means that the switches are controlled in such a way that the capacitance variation is indeed measured, and "not evaluated" means that the switches are for example kept in an inactive state, such that the capacitance variation is not measured. Furthermore, a filter and weighted averaging step 912 may yield a position determination 914. Every sensor may have an activity level, i.e. it may generate a signal that has a strength which is indicative of the level of engagement with anon-isolating object that may be brought close to the sensor, e.g. a human finger. In order to perform an FIR noise filter function four out of five activity levels may be captured such that four out of five sensors are evaluated and the sum of their activity levels is obtained in a single step. In the example shown in FIG. 9 only five consecutive scans may be required to determine the noise-filtered activity levels of each individual sensor. The sampling and filtering function may, for example, be based on the principles disclosed in patent application EP 2 667 156 A1. The skilled person will appreciate, however, that other sampling and filtering functions may also be used in combination with a user interface unit of the kind set forth. Furthermore, the skilled person will appreciate that the position calculation may optionally involve a software weighting function which may be applied to the hardware-weighted activity levels of the respective sensor elements.

Figure 10:
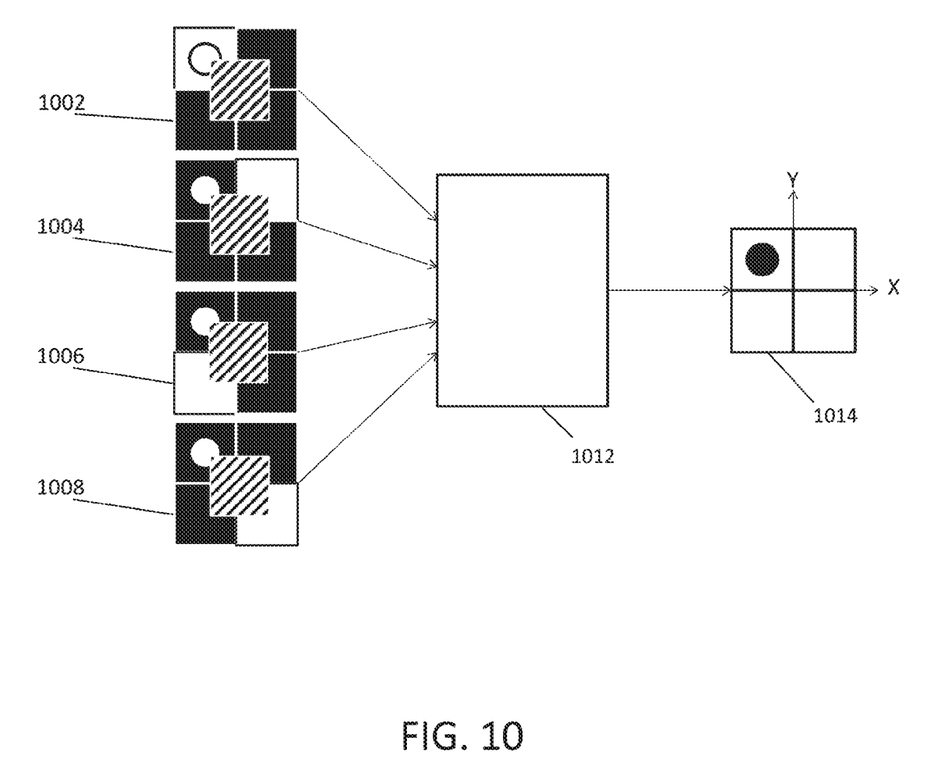
FIG. 10 shows another illustrative operation of a user interface unit.

FIG. 10 shows another illustrative operation of a user interface unit of the kind set forth. In this example, the FIR filtering is applied only to the corner sensors. Thereby, the sensor linearity may be further improved. In this case, the inner sensor is sensed alone directly after the scanning sequence of the four scans of the corner sensors. The skilled person will appreciate that, for example, the above-described hardware-based FIR noise filter function does not need to be applied at all. In this case, every sensor may be evaluated individually and filtering may be realized by means of an FIR or an infinite Impulse Response (HR) filtering function implemented in software.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 user interface unit
102a, 102b, 102c, 102d capacitive sensors
104 usable area
200 user interface unit
202a, 202b, 202c, 202d, 202e capacitive sensors
300 user interface unit
302a, 302b, 302c, 302d, 302e capacitive sensors
304a, 304b, 304c, 304d intermediate regions
304e central region
400 user interface unit
402a, 402b, 402c, 402d, 402e sensor-specific electrodes
402f common electrode
500 user interface unit
502a, 502b, 502c, 502d, 502e sensor-specific electrodes
502f common electrode
600 smart card
602 processing module
604 antenna
606a, 606b, 606c, 606d, 606e sensor-specific signal lines
606f common signal line
700 processing module
702 sub-module
704 sub-module
706a, 706b, 706c, 706d, 706e sensor-specific signal lines
706f common signal line
708 optical feedback indicator
710a, 710b antenna terminals
800 processing module
802 monolithically integrated circuit
902, 904, 906, 908, 910 scanning steps
912 filter and weighted averaging step
914 position determination
1002, 1004, 1006, 1008 scanning steps
1012 filter and weighted averaging step
1014 position determination

The invention claimed is:

1. A user interface unit for an electronic device, the user interface unit comprising:
    a two-dimensional capacitive sensor structure, the capacitive sensor structure includes an array of a plurality of corner sensor elements and a central sensor element located between the plurality of corner sensor elements, each of the corner sensor elements and the central sensor element including circuitry and a capacitor over its respective area,
    wherein the capacitors of the corner sensor elements extend toward neighboring corner sensor elements of the plurality of corner sensor elements, thereby defining intermediate regions therebetween being covered by respective capacitors of neighboring corner sensor elements, and
    each of the corner sensor elements and the central sensor element being configured and arranged to generate a signal responsive to an object at a respective area of at least one of the corner sensor elements and the central sensor element, wherein an area of each intermediate region covered by the respective capacitors is in a respective fixed ratio, and wherein a portion of the intermediate regions define a central region therebetween, the area of the central region being covered by the capacitor of the central sensor element.

2. A user interface unit as claimed in claim 1, wherein the central sensor element has a substantially octagonal shape.

3. A user interface unit as claimed in claim 1, wherein each capacitor has a first electrode and a second electrode, wherein the first electrode is specific to the sensor element comprising the respective capacitor, and wherein the second electrode is a common signal electrode that is common to the plurality of corner sensor elements and the central sensor element.

4. An electronic device comprising a user interface unit as claimed in claim 1, said electronic device further comprising a processing unit for processing sensor signals generated by the corner sensor elements and the central sensor element of the user interface unit and a plurality of signal lines for transmitting said sensor signals from the user interface unit to the processing unit, wherein each one of the capacitors is connected to one of the signal lines, wherein each one of the capacitors is arranged to generate one of the sensor signals and to transmit said one of the sensor signals to the processing unit through said one of the signal lines.

5. An electronic device as claimed in claim 4, wherein the processing unit is arranged to execute a computer program which applies a weighting function to the sensor signals generated by the user interface unit, the weighting function including a weighting factor of 0.5 for intermediate regions as compared to other areas of the corner sensor elements or the central sensor element.

6. An electronic device as claimed in claim 4, said electronic device further comprising a wireless communication module and a loop antenna for wireless communication, wherein the wireless communication module comprises an integrated antenna cross-over, said integrated antenna cross-over comprising a first antenna terminal of the wireless communication module being located outside the loop of the antenna and a second antenna terminal of the wireless communication module being located inside the loop of the antenna.

7. An electronic device as claimed in claim 6, wherein the processing unit and the wireless communication module are comprised in a monolithically integrated circuit.

8. An electronic device as claimed in claim 6, wherein the user interface unit and the loop antenna are integrated in a single-layer printed circuit-board.

9. An electronic device as claimed in claim 4, wherein the user interface unit is arranged to identify a touch-based user input interaction within a plurality of different areas formed by predefined position boundaries, and wherein each one of the different areas represents a particular key of a keypad.

10. An electronic device as claimed in claim 4, said electronic device further comprising a user feedback indicator for guiding a user through a touch-based user input process.

11. An electronic device as claimed in claim 4, wherein the user interface unit is arranged to receive a touch-based user input which represents a gesture for activating a function of the electronic device.

12. An electronic device as claimed in claim 4, being a smart card, controller circuitry configured and arranged to control a consumer device, a white good appliance, or a vehicle component.

13. A user interface unit as claimed in claim 1, wherein the area of each intermediate region covered by the respective capacitors is in a respective fixed ratio of 50:50.

14. A user interface unit as claimed in claim 1, wherein the central sensor element has a substantially rectangular shape.

15. A user interface unit as claimed in claim 1, wherein the object includes at least part of a user.

16. A user interface unit as claimed in claim 15, wherein the object includes a digit of a human hand.

17. A user interface unit for an electronic device, the user interface unit comprising:
- a two-dimensional capacitive sensor structure, the capacitive sensor structure includes an array of a plurality of corner sensor elements and a central sensor element located between the plurality of corner sensor elements, each of the corner sensor elements and the central sensor element including circuitry and a capacitor over its respective area;
- wherein the capacitors of the corner sensor elements extend toward neighboring corner sensor elements of the plurality of corner sensor elements, thereby defining intermediate regions therebetween being covered by respective capacitors of neighboring corner sensor elements; and
- each of the corner sensor elements and the central sensor element being configured and arranged to generate a signal responsive to an object at a respective area of at least one of the corner sensor elements and the central sensor element, wherein each capacitor has a first electrode and a second electrode, wherein the first electrode is specific to the sensor element comprising the respective capacitor, and wherein the second electrode is a common signal electrode that is common to the plurality of corner sensor elements and the central sensor element, and wherein the intermediate regions are defined by interdigitated first electrodes of the capacitors extending from the neighbouring corner sensor elements.

18. A method of manufacturing a user interface unit for an electronic device, the method comprising:
- providing the user interface unit with a two-dimensional capacitive sensor structure,
- providing the two-dimensional capacitive sensor structure with an array of a plurality of corner sensor elements each comprising circuitry and a capacitor over its area, wherein the capacitors of the corner sensor elements extend toward neighboring corner sensor elements of the plurality of corner sensor elements, thereby defining intermediate regions therebetween being covered by respective capacitors of neighboring corner sensor elements,
- providing the two-dimensional capacitive sensor structure with a central sensor element located between the plurality of corner sensor elements and comprising circuitry and a capacitor over its area; and
- generating a signal responsive to an object at a respective area of at least one of the corner sensor elements and the central sensor element, wherein an area of each intermediate region covered by the respective capacitors is in a respective fixed ratio, and wherein a portion of the intermediate regions define a central region therebetween, the area of the central region being covered by the capacitor of the central sensor element.

* * * * *